June 28, 1960 R. SCHILLING 2,942,459
TORSION TESTING APPARATUS
Filed June 3, 1953 4 Sheets-Sheet 1

Inventor
Robert Schilling
By
Willits, Helwig & Baillio
Attorneys

June 28, 1960 R. SCHILLING 2,942,459
TORSION TESTING APPARATUS
Filed June 3, 1953 4 Sheets-Sheet 3

Inventor
Robert Schilling
By
Willits, Helmig & Baillie
Attorneys

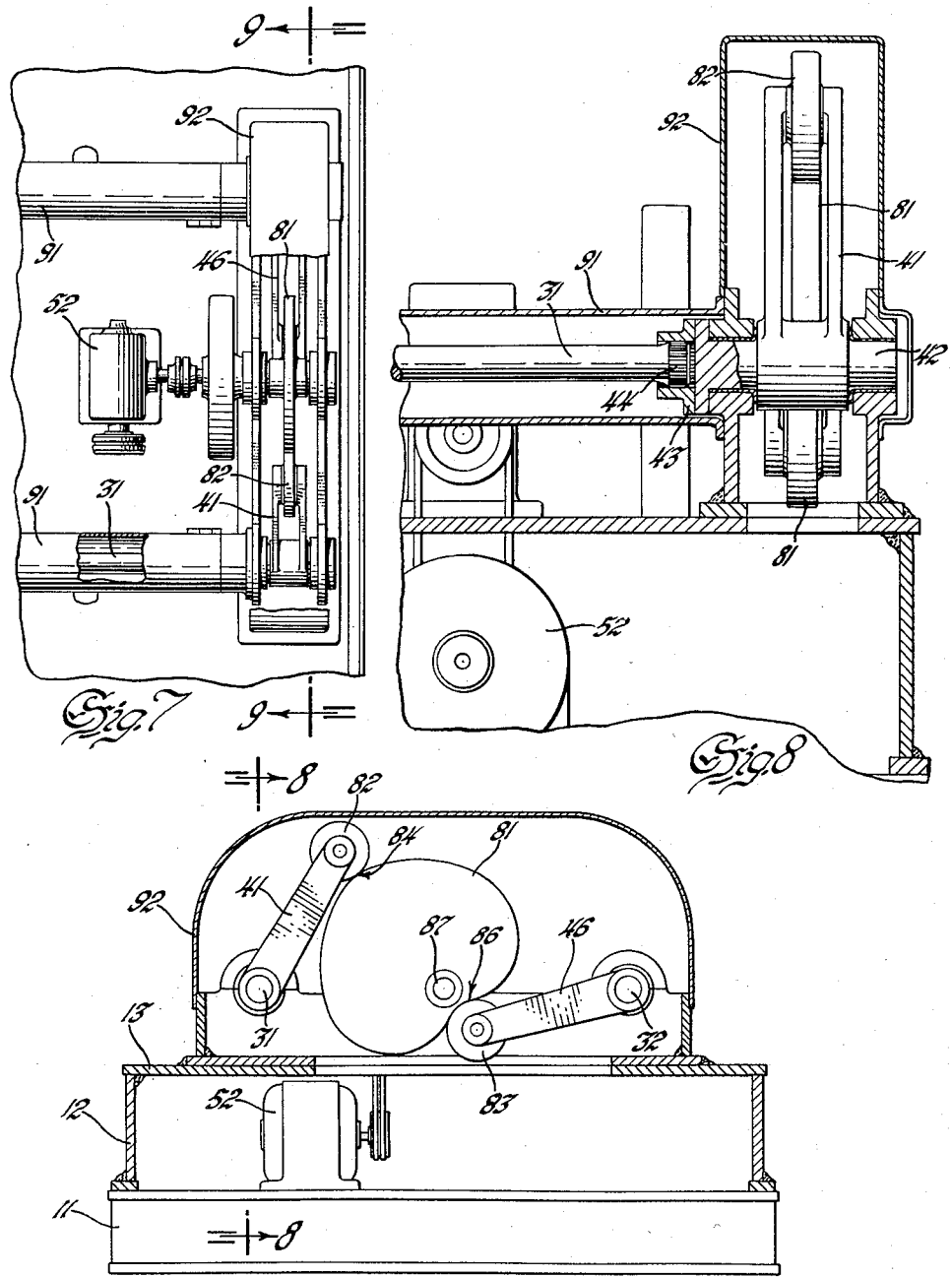

2,942,459
TORSION TESTING APPARATUS

Robert Schilling, Birmingham, Mich., assignor to General Motors Corporation, Detroit, Mich., a corporation of Delaware Filed June 3, 1953, Ser. No. 359,300

8 Claims. (Cl. 73—99)

This invention relates to a method and apparatus for torsion testing. In particular, the invention pertains to an endurance test machine for torsion springs.

In the art of testing torsion bars, it has been customary to test a single bar by alternately applying and releasing an external couple causing the bar to be torsionally deflected. In so doing, it has been necessary to provide a power mechanism to alternately apply and release the couple for the duration of the test. While such a method will give a satisfactory test, a considerable amount of power is consumed. Realizing that considerable strain energy is stored in a torsionally stressed bar a testing apparatus has now been developed which utilizes the greater proportion of this strain energy in applying such a couple at a great saving in the power normally consumed.

Thus, it is generally an object of this invention to provide a torsion bar testing apparatus in which the strain energy of a torsionally stressed bar is utilized to torsionally stress another such bar.

It is an object of the present invention to provide a method of testing a pair of torsion bars which includes torsionally stressing one bar and subsequently utilizing the strain energy of said bar to torsionally stress a second bar.

It is a further object of the invention to provide an apparatus for testing a pair of torsion bar springs, which includes providing means for restraining one end of each bar against rotation while providing a common operating mechanism for oscillating the other ends of said bars to alternately torsionally stress said bars. It is also an object to provide a device for controlling the torque load on such bars and which includes varying the torque free position of said bars.

It is a further object to provide an oscillating mechanism which simultaneously subjects one torsion bar to a maximum torque load while rendering the other bar torque free.

It is another object of the invention to provide a testing apparatus in which the torsional strain energy of one bar in unwinding is preponderantly absorbed in the torsional deflection of another bar.

Other objects of the invention will be apparent from the description of the apparatus, as well as in the appended claims.

In the drawings:

Fig. 7 is a partial plan view of a modified form of the invention.

Fig. 8 is a partial elevation of the modified form.

Fig. 9 is an end view of the modified form of the invention showing the power transmitting member in the form of a cam rather than a linkage.

Figure 4:
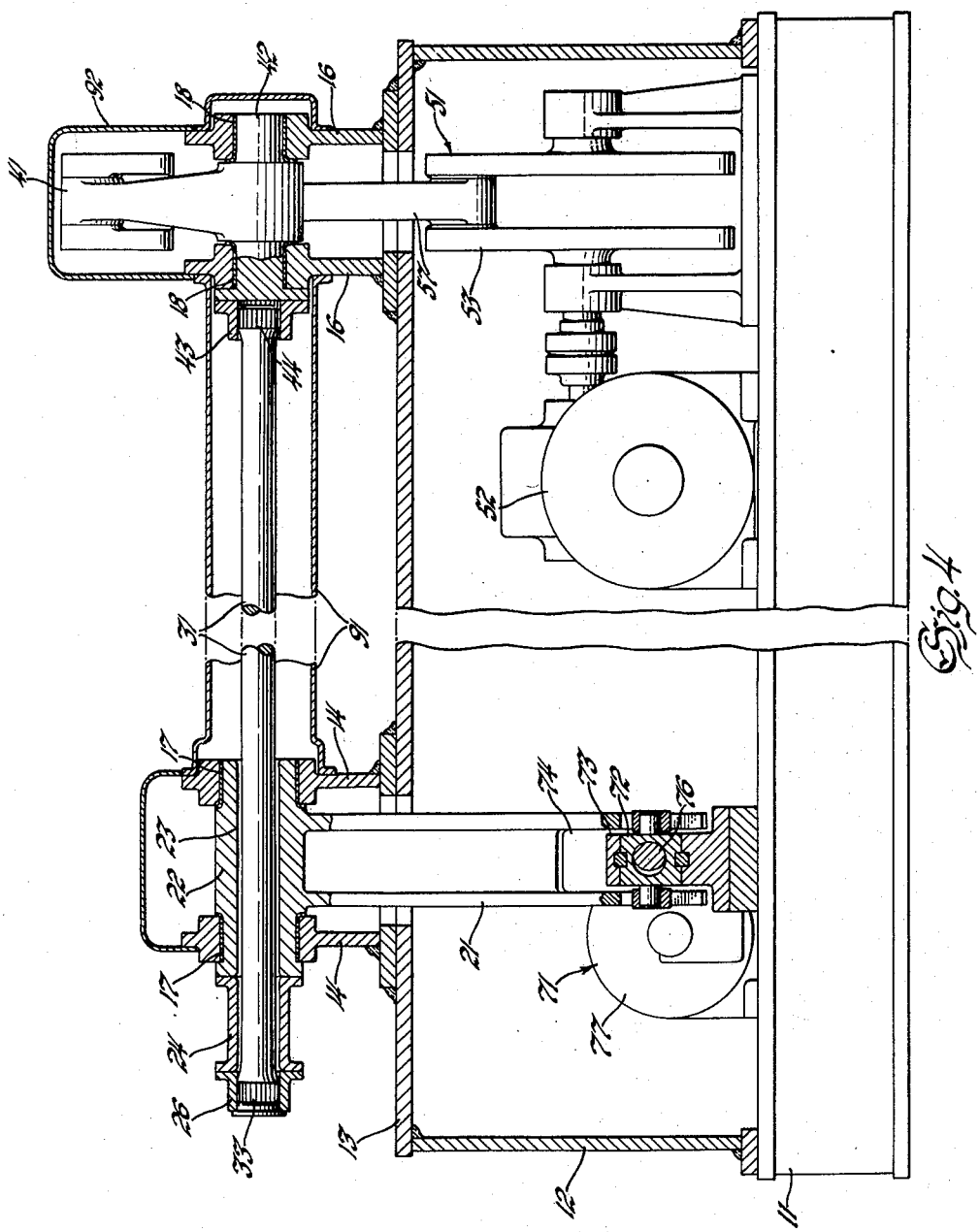
Fig. 4 is an elevated section of the testing machine taken in the plane of line 4—4 of Fig. 1 and viewed in the direction of the arrows thereon.

Referring to Figure 4 of the drawings, the testing apparatus is supported on a rigid base 11. A framework 12 is mounted directly upon base 11. Mounted upon the upper portion 13 of the frame 12 are two pairs of axially aligned supporting members 14 and 16. Supporting members 14 and 16 have axially aligned bearings 17 and 18 formed respectively therein. Rotatably mounted within bearings 17 is a T-shaped lever 21. The horizontal portion 22 of lever 21 has a hollow passage 23 therethrough coaxial with the axis of bearings 17 and 18. Secured to one end of portion 22 of lever 21 is a resilient sleeve 24. An internally splined cap 26 is secured to the other end of sleeve 24, and together with the sleeve and lever 21, constitutes a substantially unitary torsion bar anchor structure.

The torsion bars 31 and 32 to be tested by the subject apparatus are splined at both ends. For present purposes it will be sufficient to describe one torsion bar, since they are both of identical construction. One such splined end 33 is adapted to mate with the internal spline of cap 26. Thus, by maintaining lever 21 against rotary movement relative to bearings 17, splined end 33 of the torsion bar shown in Fig. 4, is rigidly supported against rotation relative to cap 26.

Rotatably mounted within bearing members 18 is another T-shaped lever 41. Rigidly secured to the horizontal portion 42 of lever 41 is another internally splined cap 43. As also seen in Fig. 4, cap 43 is adapted to receive the other splined end 44 of torsion bar 31. A similar lever 46 is secured to bar 32. The axes of levers 41 and 46 are in a plane substantially normal to axes of bars 31 and 32. The free ends 47 and 48 of levers 41 and 46 are adapted through a suitable operating mechanism (see Figs. 5 and 9), to be oscillated about the respective bearing axes, and thus to torsionally deflect and stress torsion bars 31 and 32.

Figure 1:
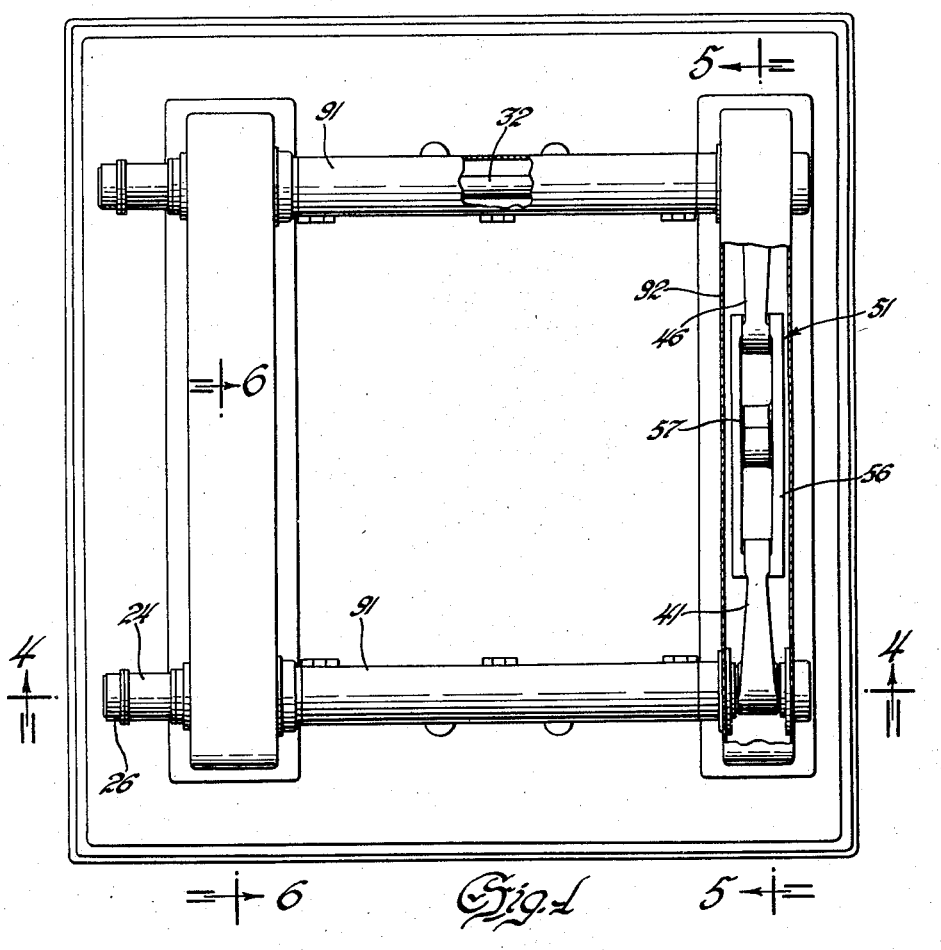
Fig. 1 is a plan view of the testing machine.
Figure 2:
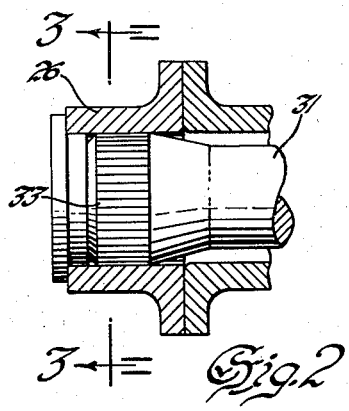
Fig. 2 is a detail section of the structure for rigidly securing one end of a torsion bar.
Figure 3:
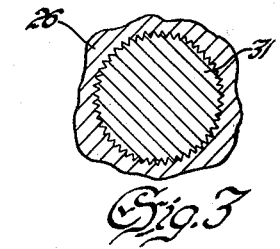
Fig. 3 is a section along line 3—3 of Fig. 2 showing further detail on the torsion bar retention structure.
Figure 5:
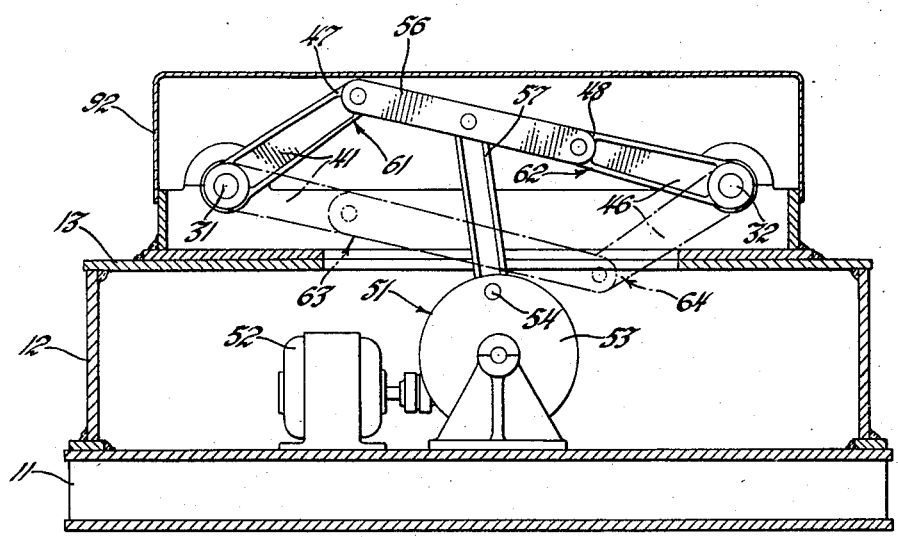
Fig. 5 is a right end view of Fig. 4 of the testing machine showing the power and motion transmitting members taken in the plane of line 5—5 of Fig. 1 and viewed in the direction of the arrows thereon.

The mechanism for producing the aforementioned oscillatory motions, which through levers 41 and 46 are transmitted to torsion bars 31 and 32, as shown in Figures 1, 4 and 5, consists of a motion producing device generally indicated at 51. The motion producing device 51 includes a source of power such as an electric motor 52 mounted upon supporting base 11 and adapted to drive a single throw crankshaft 53. Crankshaft 53 includes an eccentric pin or throw 54. Pivotally secured, as shown in Figure 5, to the free ends of operating levers 41 and 46 is a common operating lever or link 56. In order to transmit the vertical components of the motion of crankshaft 53 to levers 41 and 46, a connecting rod 57 is pivotally connected at one end to crank pin 54, and at the other end to link 56 intermediate the ends thereof.

As will be seen in Figure 5, as crank throw 54 is rotated from its zenith, or highest vertical position, to its nadir, or lowest vertical position, connecting rod 57 will move downwardly pulling link 56 therewith and causing levers 41 and 46 to rotate about their bearing supports in clockwise and counter-clockwise directions respectively. Conversely, as crank throw 54 begins its upward travel, from nadir to zenith, the direction of vertical movement of rod 57 will be reversed, and the levers 41 and 46 will rotate in opposite senses about their respective bearing axes.

It is well known that when a shaft fixed at one end is twisted by applying an external couple at the free end, the work done against the internal elastic forces which resist deformation or torsional deflection is termed strain energy, and in common with other elastic bodies the shaft possesses the property of restoring this energy when the couple is removed. This property is termed resilience.

In a perfectly elastic material the whole of the strain energy is restored when the load is removed, but in the case of a shaft twisted by an external couple a proportion of the work done is absorbed in overcoming internal molecular friction, and appears as heat in the material strained.

A similar amount of energy is absorbed by frictional resistance when the shaft returns to its original configuration after the load is removed.

Within the limit of proportionality, that is, as long as the shaft is not stressed beyond its elastic limit, only a very small proportion of the strain energy is absorbed in this way, the greater proportion being stored in the shaft. This stored energy is termed potential energy of strain or resilience, and very nearly the whole of it is restored when the load on the shaft is removed.

When such an external couple is removed, the shaft commences to untwist. During this process, a small proportion of the potential energy of strain is absorbed by frictional resistances, the greater proportion being expended in imparting motion to the shaft, or any mass connected thereto. This energy of motion is termed kinetic energy.

As previously suggested, it is a purpose of this invention to provide a torsion bar testing device in which the power consumed in testing is appreciably less than previous torsion testing machines. The well known principles of torsional and elastic vibrations, as recited above, have now been utilized in developing a method and apparatus for torsion testing a pair of torsion bars in which the power consumed is remarkably less than formerly was required to test a single such bar. To achieve this end, torsion bar operating levers 41 and 46, as well as crankshaft 53, and rod 57 and link 56, have been so proportioned that one of said torsion bars will be under maximum torque stress and deflection at the same time the other one is torque and deflection free. For instance, as illustrated in Figure 5, lever 41 is shown in the position 61 at which the maximum torque load is impressed on torsion rod 31 while lever 46 is in the position 62 in which no torque is impressed on torsion rod 32. The potential energy of strain in bar 31 tends to unwind the bar and thus, through lever 41 creates a compressive force on link 56. The compressive force is substantially balanced by lever 46 through bar 32 and its bearing supports. As bar 31 and lever 41 unwind in a clockwise direction, and rod 57 moves link 56 downward, the forces of the potential and kinetic energies of strain are transmitted through link 56 and cause bar 32 through lever 46 to be wound in a counterclockwise direction in which the bar moves from zero torque load and deflection to maximum torque load and deflection. Rod 57 continues its downward travel until lever 41 reaches position 63 in which bar 31 is torque and deflection free, and lever 46 reaches position 64 at which bar 32 is subjected to maximum torque and deflection. Thereafter, crank throw 54 reverses the travel of rod 57 and the rotation of levers 41 and 46. Thus, in one complete cycle, that is one complete revolution of crankshaft 53, one bar is oscillated from zero deflection to maximum, and back to zero deflection while the other bar proceeds from maximum to zero and back to maximum deflection. It has been known in the testing of resilient members that two such members might be placed in opposition to each other to reduce the torque necessary to drive an operating shaft. However, heretofore the opposing forces have been made to act in direct opposition to each other; that is, the maximum force from the member under stress is made available at the moment when the least force is needed to stress the other member and is almost expended at the moment when the most force is needed to assist in attaining maximum stress of the other member. Thus, considerable torque is still required to be applied to the operating shaft at the moment maximum stress is to be applied to either resilient member. The apparatus herein provided delays the application of the force of the member under stress by means of a mechanical linkage until a later moment when the greater force is more helpful in assisting the operating shaft to apply maximum stress to the member being stressed. Since the two opposing forces now form a more constant couple less torque is required to be applied to the operating shaft and there is a greater conservation of energy.

Figure 6:
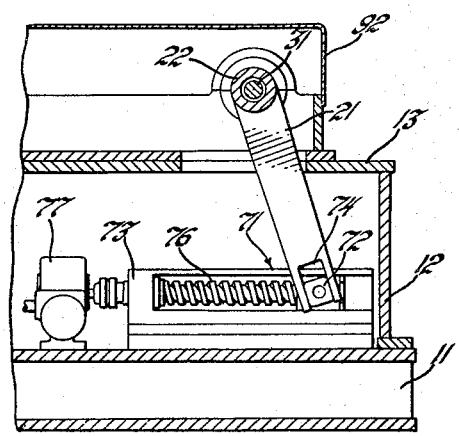
Fig. 6 is a cutaway section of the left end of Fig. 4 showing one of the two mechanisms for adjusting the maximum and zero torque points of the torsion bars taken in the plane of line 6—6 of Fig. 1 and viewed in the direction of the arrows thereon.

In order to be able to adjust the torque-free position of each torsion bar, and its operating lever, and thus coordinate the stressing and unstressing of the bars, a regulating mechanism is provided for each bar. Such a regulating mechanism is indicated generally at 71 as shown in Figures 4 and 6, and is associated with lever 21. It should, of course, be understood that a duplicate of this regulating mechanism is provided, although not shown, for bar 32. The regulating mechanism consists of a horizontally slidable block 72 mounted on a keyed way 73. The block is pivotally connected with lever 21 through a slotted portion 74 of the lever. Slidable block 72 is internally threaded to receive a rotatable screw member 76 supported within way 73. It is apparent that as screw 76 is rotated in one direction or the other, that block 72 will travel to the left or right. Any suitable source of power such as motor 77 may be employed to rotate screw 76. As seen in Fig. 6, block 72 in traversing the keyed way 73 rotates lever 21 about its bearing axis. Assuming bar 31, as shown in Figs. 4 and 6, to be initially free of any torque imposed by an external couple, then as lever 21 is rotated by regulating mechanism 71, bar 31 is twisted through sleeve 24 and cap 26 and a given torque load, predetermined for the purposes of the test, will be impressed on the bar. Likewise, the remaining torsion bar may be rendered torque free as a preliminary to beginning the testing cycle. It will thus be noted that the torque free positions 62 and 63, as seen in Fig. 5, may be varied by the torque load regulating mechanism 71.

To illustrate the operation of the subject apparatus, assuming the power transmitting mechanism to be connected as shown in Figure 5, the respective torsion bars 31 and 32 would be inserted within their respective supporting members and engaged with their splined caps. Thereafter, with crank pin 54 in substantially the position shown in Figure 5, the operator would adjust one bar through the appropriate torque regulating mechanism to have zero torque thereon while the other torsion bar, in this case 31, through its control mechanism 71 is rotated until the maximum desired torsion load or couple is impressed thereupon. Thereafter, as explained above, as crankshaft 53 is rotated by motor 52, the torsion bars will alternately and periodically be stressed and unstressed until the torsion test has been completed.

In order to be able to measure the applied torque, resilent sleeve 24 may be associated with any well known torque measuring device which can measure the deflection of the sleeve, and thus indictae the torque load on said torsion bar.

A modified form of applicant's apparatus is shown in Figures 7, 8 and 9. The motion transmitting member instead of constituting a linkage mechanism is shown as an eccentric cam 81 having a double involute curvature. Instead of the free ends of the torsion bar operating levers 41 and 46 being pivotally connected to a common operating member, they are instead provided at the free ends with rollers 82 and 83. The rollers 82 and 83 are adapted to follow the curvature of cam 81, and in so doing, stress and unstress their respective torsion bar. The radius of curvature of cam 81 is of course a maximum at the point of minimum curvature, generally indicated at 84, while said radius is a minimum at the point of maximum curvature generally indicated at 86. In Figure 9, follower 82 is shown adjacent the point of minimum curvature and maximum radius of curvature in which position lever 41 has been rotated farthest away from the axis of rotation 87 of cam 81, and which represents the position of maximum torque on bar 31. Follower 83, on the other hand, is adjacent the point of maximum curvature or in the position zero torque. Thus, it will be observed that as cam 81 is rotated by motor 52, levers 41 and 46 will again be oscillated and thus alternately torsionally stress and deflect bars 31 and 32.

An advantage of the cam and follower mechanism is that it is more easily adaptable to varying operating requirements. That is to say, stroke and force balance can be altered by installing a different cam. It is also possible to design a cam with better force balances than can be obtained with a linkage, and thus the driving power for the apparatus can still be further reduced.

Casing members 91 and 92 are provided to enclose the torsion bars and the motion producing mechanism.

Although certain forms of this invention have been disclosed for the purpose of making clear the operation thereof, it is to be understood that various structural modifications may be made within the intended scope of the invention.

I claim:

1. A test apparatus which includes means for supporting a pair of bar members in spaced relation to each other, means restraining one end of each of said bar members, means for torsionally prestressing one of said bar members, means connecting said bar members together and thereby imposing an equal and opposite stress load on the other of said bar members, and means engaging said connecting means for alternately torsionally stressing first one and then the other of said bar members, the one of said members under maximum stress being disposed to assist said last-mentioned means in stressing the other of said members.

2. A test apparatus as provided for by claim 1 having said bars disposed in parallel spaced relation and having torsion applying lever arms secured to the other ends thereof and engaged together through said connectnig means.

3. A test apparatus as provided for by claim 1 having said means restraining the one end of each of said bars including adjustable locking means for varying the torque load applied to each of said bars.

4. A torsion bar testing device comprising means for supporting a pair of torsion bars in parallel spaced relation and including adjustable means for securing one of the ends of each of said bars against inadvertent rotation, lever arms secured to the other ends of said bars for applying a torsional stress thereto, an operating mechanism connected to said interconnecting said lever arms for simultaneously oscillating said lever arms, and means for angularly adjusting said securing means to torsionally prestress said bars whereby the oscillation of said levers by said mechanism acts to increase the torsional stress in one of said bars while decreasing the torsional stress in the other of said bars.

5. The torsion bar testing device of claim 4 wherein said operating mechanism includes a single throw crankshaft, means for driving said crankshaft, a connecting rod engaged with said crankshaft, and a pivotal link interconnecting said lever arms and pivotally engaged to said connecting rod whereby movement of said link imposes a torsional load on one of said bars and the torsional load within the other of said bars acts through said pivotal link to assist in the torsional loading of said one bar.

6. The torsion bar testing device of claim 4 wherein said operating mechanism includes a driven cam member, and said lever arms include cam follower means engaged with said cam member, said cam member having surfaces thereon against which the lever arm connected to the torsionally loaded of said bars will apply a cam driving force to assist in the torsional loading of the other of said bars.

7. A torsion bar testing device comprising means for supporting a pair of torsion bars in substantially parallel spaced relation, means securing one of the ends of each of said torsion bars against inadvertent rotation, oscillating means engaged with the other of the ends of said bars for torsionally stressing said bars alternately in opposite rotational directions, means associated with each of said bars for applying a torsional prestress thereto, and drive means engaged with and interconnecting said oscillating means with said torsion bars respectively engaged thereby being torsionally stressed in opposite rotational directions by said prestressing means whereby the further torsional loading of either one of said torsion bars by said drive means is assisted by the torsional unloading of the other of said torsion bars.

8. A torsion bar testing device comprising means for supporting a pair of torsion bars in parallel spaced relation, means securing one of the ends of each of said torsion bars against inadvertent rotation, torque applying lever arms secured to the other ends of each of said torque bars, and operating means engaged with and interconnecting said lever arms, one of said securing means being adapted to angularly adjust one of said bars for imposing a torsional load thereon in a rotational direction opposite to that which will be first imposed upon the other of said torsion bars by said drive means acting through the lever arm secured to such other bar.

References Cited in the file of this patent

UNITED STATES PATENTS

| | | |
|---|---|---|
| 359,978 | Keller | Mar. 22, 1887 |
| 1,091,219 | Harvey | Mar. 24, 1914 |
| 2,150,792 | Willat | Mar. 14, 1939 |
| 2,157,903 | Lapsley | May 9, 1939 |
| 2,188,853 | Buckwalter | Jan. 30, 1940 |
| 2,381,241 | Wilcox | Aug. 7, 1945 |
| 2,712,756 | Greer et al. | July 12, 1955 |

FOREIGN PATENTS

| | | |
|---|---|---|
| 442,349 | Great Britain | Feb. 6, 1936 |